US010609311B2

(12) United States Patent
Delattre (10) Patent No.: US 10,609,311 B2
(45) Date of Patent: Mar. 31, 2020

(54) METHOD AND DEVICE FOR INCREASING RESOLUTION OF AN IMAGE SENSOR (71) Applicant: NINTENDO CO., LTD., Kyoto (JP)

(72) Inventor: Alexandre Delattre, Paris (FR)

(73) Assignee: NINTENDO CO., LTD., Kyoto (JP)

( * ) Notice: Subject to any disclaimer, the term of this patent is extended or adjusted under 35 U.S.C. 154(b) by 0 days.

(21) Appl. No.: 15/243,001

(22) Filed: Aug. 22, 2016

(65) Prior Publication Data
US 2017/0078592 A1 Mar. 16, 2017

(30) Foreign Application Priority Data

Sep. 11, 2015 (EP) .................................... 15306402

(51) Int. Cl.
*H04N 5/345* (2011.01)
*H04N 5/349* (2011.01)
*H04N 5/225* (2006.01)
*H04N 5/238* (2006.01)
*H04N 9/04* (2006.01)

(52) U.S. Cl.
CPC ........... *H04N 5/349* (2013.01); *H04N 5/2254* (2013.01); *H04N 5/2258* (2013.01); *H04N 5/2259* (2013.01); *H04N 5/238* (2013.01); *H04N 9/045* (2013.01)

(58) Field of Classification Search
CPC ........................... H04N 5/2254; H04N 5/3458
USPC ........................................ 348/335, 337, 340
See application file for complete search history.

(56) References Cited

U.S. PATENT DOCUMENTS

| 4,589,030 A * | 5/1986 | Kley .................... H04N 3/1593 348/218.1 |
| 8,811,769 B1 * | 8/2014 | Pitts .......................... G06T 3/40 382/275 |
| 9,426,383 B1 * | 8/2016 | Hinkel ................... H04N 5/238 |
| 2001/0031099 A1 | 10/2001 | Kondo et al. |
| 2004/0114045 A1 * | 6/2004 | Gouch ................. H04N 1/3876 348/218.1 |
| 2007/0081200 A1 | 4/2007 | Zomet et al. |

(Continued)

FOREIGN PATENT DOCUMENTS

GB 2 270 230 3/1994

OTHER PUBLICATIONS

Search Report dated Feb. 23, 2016 in corresponding European Application No. 15306402.7.

*Primary Examiner* — Anthony J Daniels
(74) *Attorney, Agent, or Firm* — Nixon & Vanderhye, P.C.

(57) ABSTRACT

The provided solution is an optical system comprising an image sensor and a collecting entrance lens having a predetermined field of view, the optical device further comprising a dynamically configurable light barrier having at least two masking elements, the dynamically configurable light barrier being configured so that only one of the masking elements can be set in a state in which light passes through, the at least two masking elements being configured so that images acquired by the image sensor when one of the at least two masking elements is configured in a state in which light passes through represent different portions of the predetermined field of view than images acquired by the image sensor when another one of the at least two masking elements is configured in a state in which light passes through.

18 Claims, 5 Drawing Sheets (56) References Cited

U.S. PATENT DOCUMENTS

| | | | |
|---|---|---|---|
| 2008/0007645 A1* | 1/2008 | McCutchen | H04N 5/238 |
| | | | 348/360 |
| 2012/0026364 A1 | 2/2012 | Kuma | |
| 2012/0069209 A1 | 3/2012 | Gudlavalleti et al. | |
| 2013/0002884 A1* | 1/2013 | Nakagawara | H04N 5/23212 |
| | | | 348/169 |
| 2015/0002694 A1* | 1/2015 | Hasegawa | H04N 5/2357 |
| | | | 348/226.1 |
| 2015/0156478 A1* | 6/2015 | Ono | H04N 5/2251 |
| | | | 348/49 |
| 2015/0286340 A1* | 10/2015 | Send | G01S 17/46 |
| | | | 345/175 |

\* cited by examiner

METHOD AND DEVICE FOR INCREASING RESOLUTION OF AN IMAGE SENSOR

CROSS-REFERENCE TO RELATED APPLICATIONS

This application claims the benefit under 35 U.S.C. § 119(a)-(d) of European Patent Application No. 15306402.7, filed on Sep. 11, 2015 and entitled "Method and device for increasing resolution of an image sensor". The above cited patent application is incorporated herein by reference in its entirety.

BACKGROUND OF THE INVENTION

Embodiments of the disclosure relate to image sensors and in particular to a method and a device for obtaining high resolution images from low resolution image sensors.

Gaze tracking is typically used in computer interfaces to increase interaction between a user and a computer. It aims at providing the coordinates of a point or of a set of points (i.e. a path) in a reference frame, typically a reference frame associated with images obtained through an image sensor. Such a point or a path can be used for numerous applications such as selecting an object in a graphical user interface, identifying a target in a flight simulator, or diagnosing visual disorders.

According to a particular implementation, an infrared beam illuminates an eye to obtain bright pupils and the reflected beam is picked up by an image sensor. The resulting images are then processed to detect the location of the reflected beam in the images. Knowing the location of the infrared beam source and of the image sensor enables a gaze point to be determined.

Sometimes, an aperture of f/6 is used to provide a tradeoff between diffraction and depth of field (DoF), and the pixel size of the image sensor is about 3 μm to optimize density and sensitivity.

As set forth in the thesis entitled "*Eye Gaze Tracking for Human Computer Interaction*" (Heiko Drewes, 2010, Dissertation, LMU München: Faculty of Mathematics, Computer Science and Statistics), it is commonly accepted that the user's eyes requires about 100 pixels resolution for tracking the representation of an iris, of which the average size ($iris_{size}$) is about 11 mm.

When considering a horizontal field of view (FoV) of 50° and a distance of 40 cm between the user's eyes and a display (with which an image sensor is associated), the horizontal field of view ($FoV_{size}$) corresponds to about 37 cm on that display.

Accordingly, the number of pixels ($nb_{pixels}$) required for a field of view of 50° at a distance of 40 cm, i.e. the image sensor width, can be expressed as follows:

$$nb_{pixels} = \frac{resolution}{iris_{size}} \times FoV_{size} = \frac{100}{11} \times 370 \approx 3,400$$

Such a number of pixels makes it possible to cover the whole horizontal area of 37 cm facing the sensor and get a resolution of 100 pixels for an object having a size of 11 mm.

As a result, considering a pixel width of 3 μm, the image sensor width is about 10.2 mm (3,400×3 μm).

For a field of view approximately equal to 50° and an image sensor width ($S_{width}$) equal to 10.2 mm, the focal distance (f) of the lens is about 11 mm:

$$f = \frac{S_{width}}{2\tan\left(\frac{FoV}{2}\right)} = \frac{10.2}{2\tan\left(\frac{50}{2}\right)} \approx 11$$

For reference, an 11 mm lens with an aperture of f/6 provides a depth of field (DoF) of about 6.2 cm at 40 cm.

However, although such an optical system may make it possible to track eyes, it presents drawbacks. In particular, a 10.2 mm width image sensor with pixel width of 3 μm is indeed expensive.

As a consequence, there is a need for providing optical systems capable of acquiring high resolution images, using low resolution image sensors, in particular to allow efficient implementation of tracking algorithms at a reasonable price.

BRIEF SUMMARY OF THE INVENTION

Various embodiments described herein have been devised to address one or more of the foregoing concerns.

In this context, a solution for increasing resolution of an image sensor is provided.

According to a first object of the invention, an optical device comprising an image sensor and a collecting entrance lens having a predetermined field of view is provided, the optical device further comprising a dynamically configurable light barrier having at least two masking elements, the dynamically configurable light barrier being configured so that at least one of the masking elements can be set in a state in which light passes through, the at least two masking elements being configured so that images acquired by the image sensor when one of the at least two masking elements is configured in a state in which light passes through represent different portions of the predetermined field of view than images acquired by the image sensor when another one of the at least two masking elements is configured in a state in which light passes through.

Therefore, the optical device of the invention makes it possible to obtain different images that represent different parts of a real scene, the resolution of which being higher than the one of an image of the real scene obtained from the same sensor in a single acquisition step. This optical system is particularly adapted for applications such as gaze tracking. In other words, the invention makes it possible to increase the field of view without increasing the size of the sensor. This is obtained without substantially decreasing or increasing the depth of field.

In an embodiment, only one of the masking elements can be set in a state in which light passes through.

In an embodiment, the at least two masking elements are configured as an array of masking elements arranged perpendicularly to the optical axis of the image sensor and of the collecting entrance lens.

In an embodiment, the optical device further comprises a computing device for controlling the dynamically configurable light barrier and receiving images from the image sensor.

In an embodiment, the computing device is configured for applying a geometric distortion to an image received from the image sensor, the geometric distortion being predetermined and identified as a function of a selected masking element.

In an embodiment, the optical device further comprises a micro-prism array, each micro-prism of the micro-prism array being associated with a different masking element.

In an embodiment, the optical device further comprises a second collecting entrance lens and a second image sensor, images acquired by the second image sensor representing the predetermined field of view.

In an embodiment, a masking element to be selected is identified as a function of processing an image acquired from the second image sensor.

In an embodiment, the dynamically configurable light barrier is of the LCD type.

A second aspect of the invention provides a method for obtaining images in an optical system comprising an image sensor and a collecting entrance lens having a predetermined field of view, the optical device further comprising a dynamically configurable light barrier having at least two masking elements, the dynamically configurable light barrier being configured so that at least one of the masking elements can be set in a state in which light passes through, the at least two masking elements being configured so that images acquired by the image sensor when one of the at least two masking elements is configured in a state in which light passes through represent different portions of the predetermined field of view than images acquired by the image sensor when another one of the at least two masking elements is configured in a state in which light passes through, the method comprising:

identifying a masking element;
selecting the identified masking element to set the identified masking element in a state in which light passes through; and
obtaining an image from the image sensor.

Therefore, the method of the invention makes it possible to obtain different images that represent different parts of a real scene, the resolution of which being higher than the one of an image of the real scene obtained from the same sensor in a single acquisition step. It is particularly adapted for applications such as gaze tracking.

In an embodiment, only one of the masking elements can be set in a state in which light passes through.

In an embodiment, the method further comprises a step of obtaining and applying a corrective geometric deformation to an image obtained from the image sensor.

In an embodiment, the corrective geometric deformation is obtained as a function of a selected masking element.

In an embodiment, the method further comprises a step of obtaining an image representing the predetermined field of view, wherein the step of identifying a masking element comprises a step of processing the image representing the predetermined field of view.

In an embodiment, the step of processing the image representing the predetermined field of view comprises a step of identifying a region of interest.

Since parts of the present invention can be implemented in software, parts of the present invention can be embodied as computer readable code for provision to a programmable apparatus on any suitable carrier medium, and in particular a suitable tangible carrier medium or suitable transient carrier medium. A tangible, non-transitory carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE SEVERAL VIEWS OF THE DRAWINGS

Embodiments of the invention will now be described, by way of example only, and with reference to the following drawings in which:

FIG. 1, comprising

FIG. 4, comprising

DETAILED DESCRIPTION OF THE INVENTION

According to embodiments described herein, an image sensor is illuminated by light passing through one "pinhole" selected from a plurality of "pinholes" each of which are associated with a particular prism to direct light passing through the corresponding "pinhole" to the image sensor.

By choosing appropriately the "pinhole" to be used, one can select the part of a real scene of which a representation is to be acquired by an image sensor.

Figure 1A:
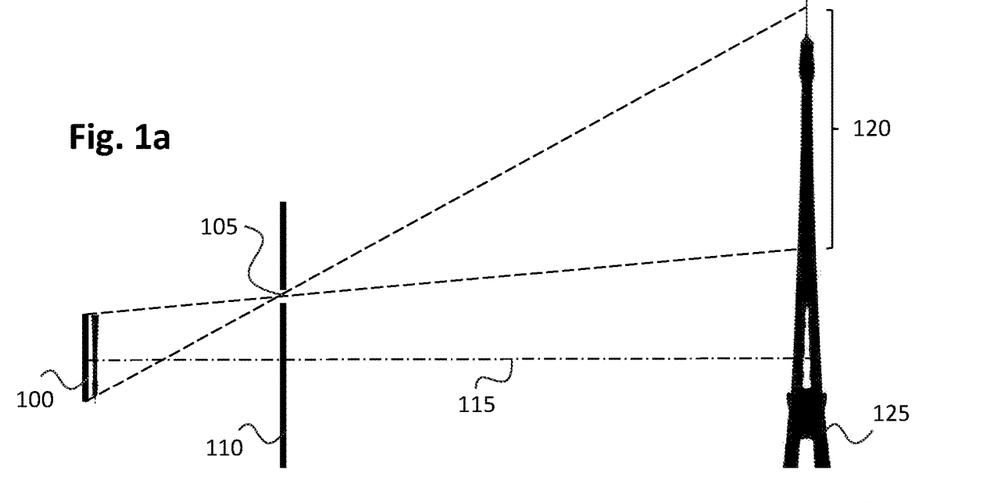
FIGS. 1a to 1c, illustrates a general optic effect produced when a pinhole through which light illuminating an image sensor is offset from the main axis of the image sensor.
Figure 1B:
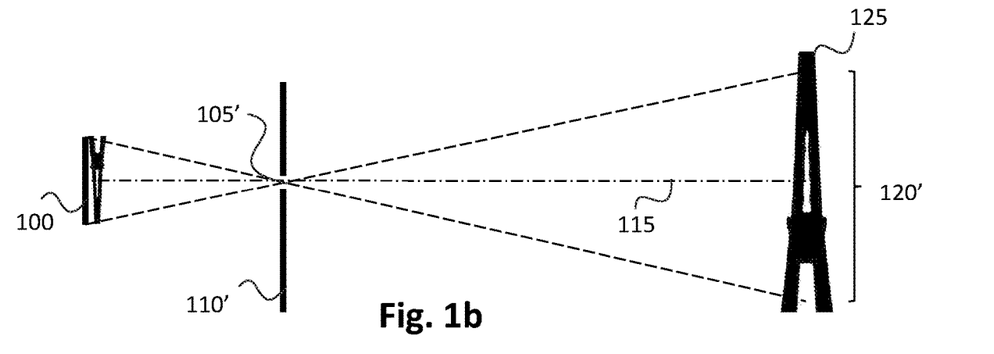
Figure 1C:
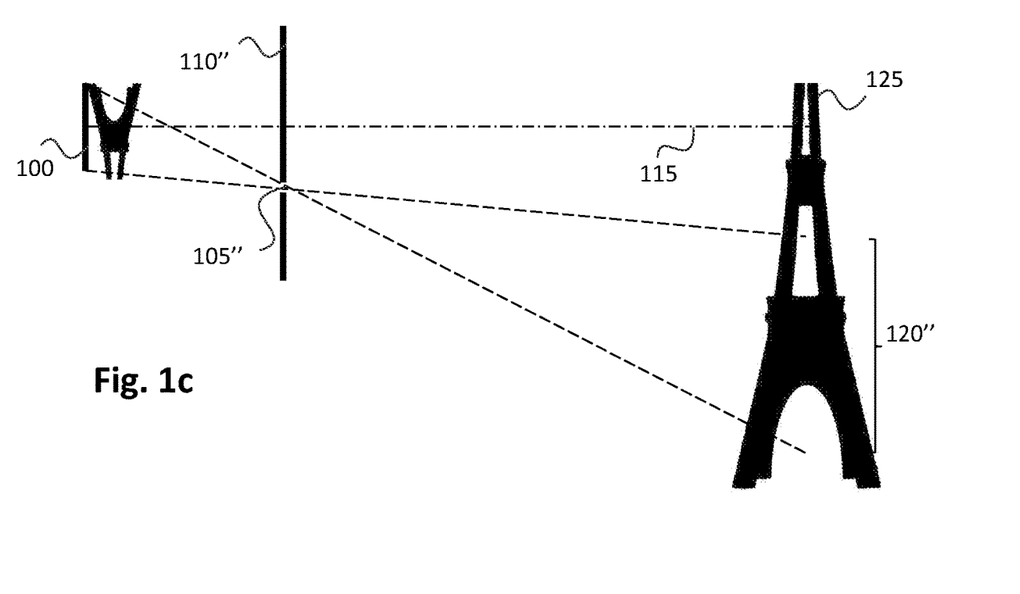

FIG. 1, comprising FIGS. 1a to 1c, illustrates a general optic effect produced when a pinhole through which light illuminating an image sensor is offset from the main axis of the image sensor.

As illustrated in FIG. 1a, image sensor 100 is illuminated by light passing through pinhole 105 arranged in light barrier 110. Pinhole 105 is arranged above optical axis 115 of image sensor 100 (i.e. the axis which is perpendicular to the image sensor and centered on it).

Therefore, the arrangement comprising image sensor 100 and light barrier 110 having pinhole 105 makes it possible to acquire images representing real objects located above optical axis 115 of image sensor 100, for example upper part 120 of Eiffel tower 125.

Similarly, FIG. 1b represents image sensor 100 which is illuminated by light passing through pinhole 105' arranged in light barrier 110, pinhole 105' being centered on optical axis 115 of image sensor 100.

As a consequence, the arrangement comprising image sensor 100 and light barrier 110 having pinhole 105' makes it possible to acquire images representing real objects which face image sensor 100, for example center part 120' of Eiffel tower 125.

Likewise, FIG. 1c represents image sensor 100 which is illuminated by light passing through pinhole 105″ arranged in light barrier 110, under optical axis 115 of image sensor 100.

Accordingly, the arrangement comprising image sensor 100 and light barrier 110 having pinhole 105″ makes it possible to acquire images representing real objects located under optical axis 115 of image sensor 100, for example lower part 120″ of Eiffel tower 125.

Based on the optical effect described by reference to FIG. 1, embodiments of the invention are directed to selecting one 'pinhole' using a dynamically configurable light barrier such as an LCD display (liquid crystal display) used as a selective light barrier, referred to as a dynamic LCD barrier.

Naturally, technologies other than LCD can be used to selectively block or let light pass through a barrier.

According to particular embodiments, the LCD barrier is combined with a collective entrance lens and/or with a micro-prism array so as to optimize illumination of the image sensor.

An autofocus element such as an autofocus element based on an electro-wetting lens can also be used.

It is to be noted that geometric distortions appear when the 'pinhole' through which light illuminating an image sensor is offset from the main axis of the image sensor and when a prism is used to direct light on the sensor. However, such distortions that may be considered as aberration of axial points (spherical aberration) may be computed and thus, it is possible to compensate for them using a standard corrective geometric deformation.

Figure 2:
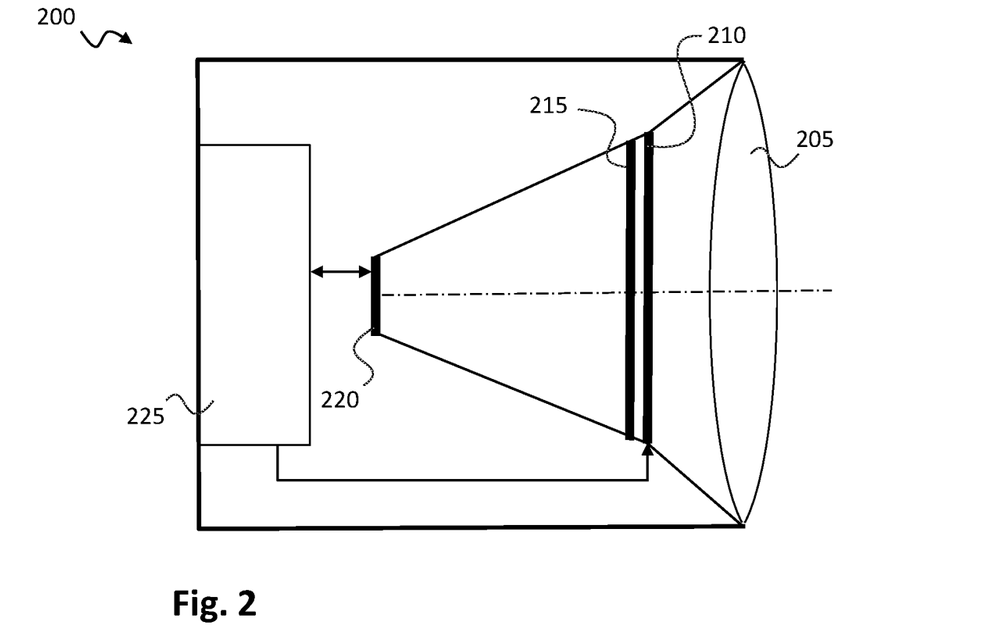
FIG. 2 is a block diagram illustrating an example of architecture for an optical system according to first embodiments of the invention.

FIG. 2 is a block diagram illustrating an example of architecture for an optical system according to first embodiments of the invention.

As illustrated, optical system 200 comprises collecting entrance lens 205, dynamic LCD barrier 210, micro-prism array 215, image sensor 220, and computing device 225. Collecting entrance lens 205, dynamic LCD barrier 210, micro-prism array 215, and image sensor 220 are optically aligned.

Image sensor 220 and dynamic LCD barrier 210 are controlled by computing device 225 which also receives images acquired by image sensor 220. Computing device 225 may comprise a network interface to communicate with a remote device, for example a remote server.

Dynamic LCD barrier 210 is typically an array of masking elements which are controlled individually to selectively block or allow light to pass through to play the role of a 'pinhole'. It can be, for example, an array of 5×5 or 10×10 masking elements. Naturally, the number of horizontal masking elements may be different from the number of vertical masking elements. Likewise, the size of the masking elements may vary from one masking element to another.

According to particular embodiments, all the masking elements advantageously block light, in operation, except one which allows light to pass through.

According to other embodiments, for example when a single masking element is not large enough to allow enough light to pass though and/or when several masking elements are associated with a single micro-prism, all the masking elements block light, in operation, except a set of several masking elements which allow light to pass through.

Masking elements can be arranged so that the resulting images overlap or not.

Micro-prism array 215 may consist in a set of micro-prisms arranged so that one micro-prism is associated with each masking element of the dynamic LCD barrier (or with most of the masking elements since there is no need to use a micro-prism in conjunction with the masking element aligned on the optical axis of the image sensor). According to particular embodiments, one micro-prism is associated with several masking elements of the dynamic LCD barrier that may be collectively controlled.

Each micro-prism aims at directing light passing through the associated masking element(s) to the image sensor.

According to particular embodiments, a lens may be combined with a micro-prism. This is particularly useful when the sizes of the masking elements are not the same for all the masking elements (or wherein the number of masking elements associated with each micro-prism varies).

It is to be noted that, for the sake of clarity, no autofocus device is represented in the optical device illustrated in FIG. 2. However, such a device may be implemented in the optical system on a standard basis.

Figure 3:
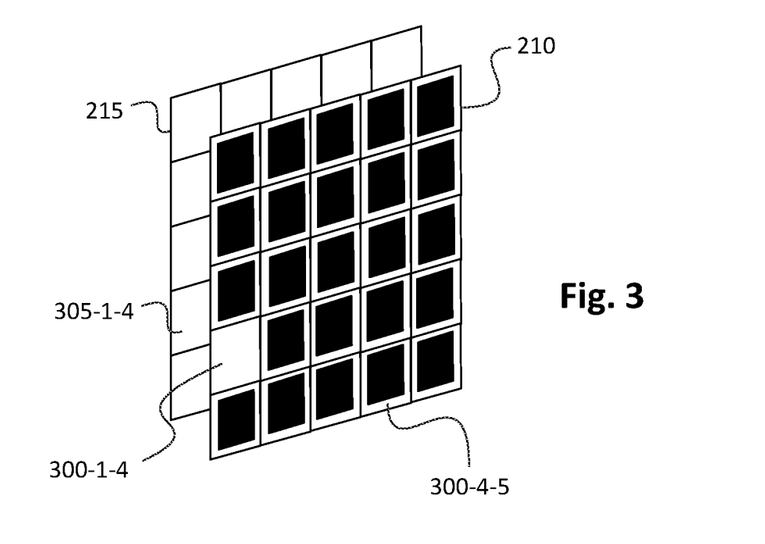
FIG. 3 illustrates an example of an arrangement comprising a dynamic LCD barrier and a micro-prism array such as those represented in FIG. 2.

FIG. 3 illustrates an example of an arrangement comprising dynamic LCD barrier 210 and micro-prism array 215 of FIG. 2.

For the sake of illustration, dynamic LCD barrier 210 is a 5×5 array of similar masking elements, generically denoted 300, comprising masking elements 300-1-4 and 300-4-5, located on the first and fourth column and on the fourth and fifth line, respectively.

According to the illustrated example, all the masking elements block light except one which allows light to pass through, for example masking element 300-1-4.

According to particular embodiments, setting a masking element in a state in which light passes through sets all the other masking elements in a state in which light is blocked. For example, starting from the configuration illustrated in FIG. 3, setting masking element 300-2-3 (located on the second column and on the third line) in a state in which light passes through sets masking element 300-1-4 in a state in which light is blocked.

As illustrated in FIG. 3, each micro-prism of micro-prism array 215 is associated with a particular masking element. For the sake of illustration, micro-prism 305-1-4 is associated with masking element 300-1-4 so that light passing through masking element 300-1-4 is directed to an image sensor associated with the arrangement illustrated in FIG. 3.

Considering a 5×5 array of similar masking elements and a 5×5 array of micro-prisms and considering the example discussed in the background section (according to which an image sensor width should be equal to 3,400 pixels), the image sensor width can be reduced to 680 pixels to obtain similar results. As a consequence, still considering pixels having a size of 3 μm, the image sensor width is equal to 2 mm (instead of 10.2 mm according to the prior art).

Figure 4A:
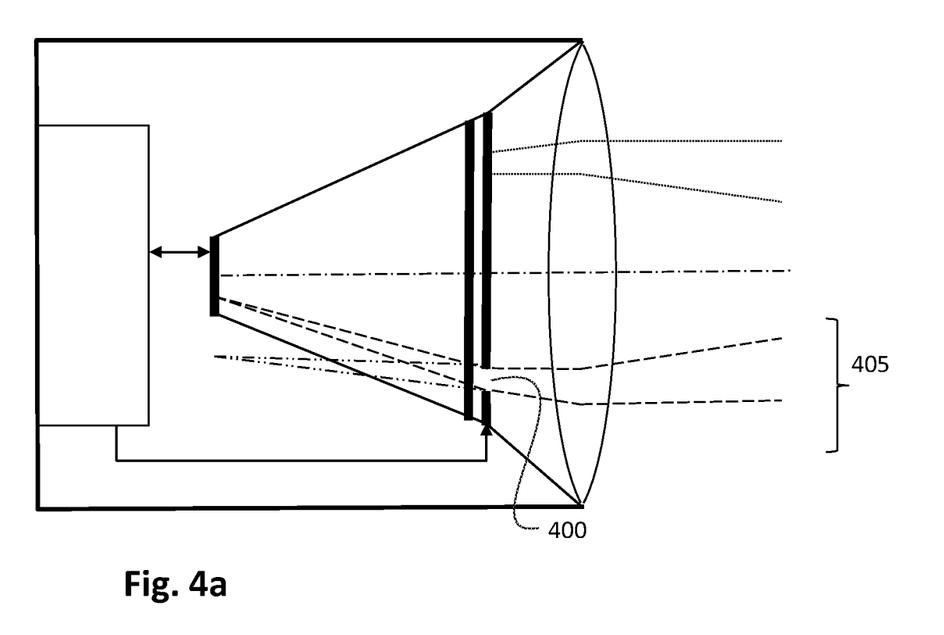
FIGS. 4a and 4b, illustrates the selection of two different masking elements in an optical system such as the one described in reference to FIG. 2.
Figure 4B:
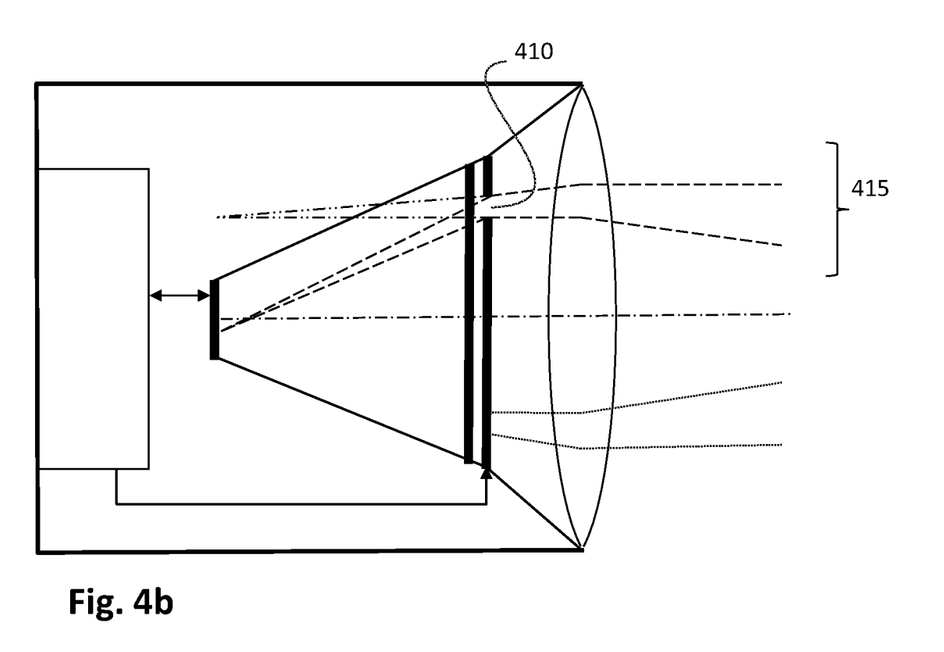

FIG. 4, comprising FIGS. 4a and 4b, illustrates the selection of two different masking elements in an optical system such as the one described in reference to FIG. 2.

As illustrated, selecting masking element 400 (so that light passes through masking element 400) makes it possible to acquire a representation of real objects located at position 405 while selecting masking element 410 (so that light passes through masking element 410) makes it possible to acquire a representation of real objects located at position 415.

Therefore, optical system 200 makes it possible to reduce the size of the image sensor without decreasing the resolution and/or the field of view.

Figure 5:
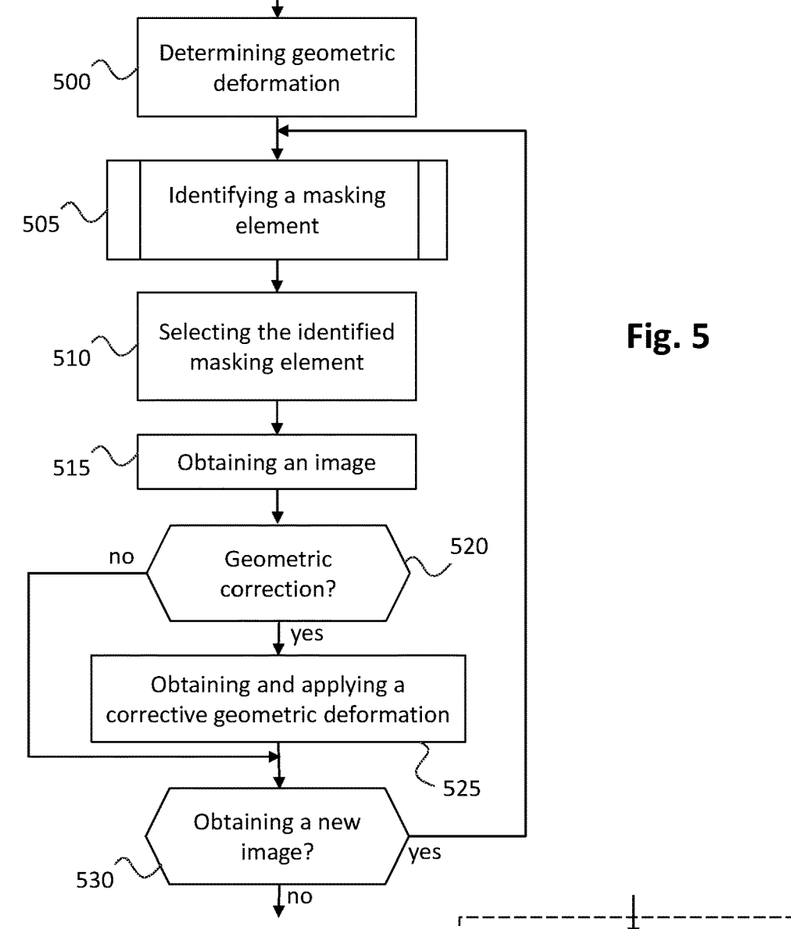
FIG. 5 is a flowchart illustrating steps of a method for obtaining images from an image sensor such as the one described by reference to FIG. 2.

FIG. 5 is a flowchart illustrating steps of a method for obtaining images from an image sensor such as the one described by reference to FIG. 2.

As illustrated, a first step (step 500) aims at determining geometric deformations resulting from the relative position of the masking elements in relation to the optical axis of the image sensor.

According to embodiments, each of the masking elements are considered individually so as to determine the geometric deformation in images obtained when the corresponding masking element is set in a state in which light passes through.

The determined geometric deformation is then used to compute a corrective geometric deformation which is to be applied on images acquired from the image sensor to correct the geometrical deformation resulting from the position of the corresponding masking element.

It is to be noted that minor geometric deformation may be ignored.

For example, in particular embodiments, a corrective geometric deformation is not computed for the masking element being centered on the optical axis of the image sensor and for the masking elements which are close to that masking element.

The computed corrective geometric deformations are stored to be used later during image acquisition.

Next, it is determined which of the masking elements is to be selected to be set in a state in which light passes through (step 505). The way a masking element is selected mainly depends on the applications.

For example, in an application that requires obtaining a full high resolution image, each of the masking elements is preferably cyclically selected.

On the contrary, in a gaze tracking application, only partial high resolution images corresponding to regions of interest are processed (i.e. the portions of the image wherein the eyes are represented). Therefore, only the masking elements corresponding to that partial high resolution images are selected (one after another). An example of implementation of such an example of application is described by reference to FIGS. 6 and 7.

Next, the identified masking element is selected and set in a state in which light passes through (step 510) and one or several images are acquired (step 515).

After an image has been obtained, it is determined whether or not a geometric correction is to be applied on the obtained image (step 520).

If a geometric correction is to be applied on the obtained image, the corrective geometric deformation associated with the selected masking element is obtained and applied to the obtained image (step 525).

On the contrary, if no geometric correction is to be applied on the obtained image, or after a geometric correction has been applied on the obtained image, a test is carried out to determine whether or not another image is to be obtained (step 530).

If another image is to be obtained, the last six steps (steps 505 to 530) are repeated, i.e. the algorithm is looped to step 505 as illustrated.

Steps 505 to 530 are typically carried out in computing device 225 of optical system 200 described by reference to FIG. 2. Step 500 can be carried out in a remote computer or server.

According to particular embodiments, the optical system of the invention further comprises at least another image sensor used to determine a region of interest (ROI) which is used to select one or several masking elements.

Figure 6:
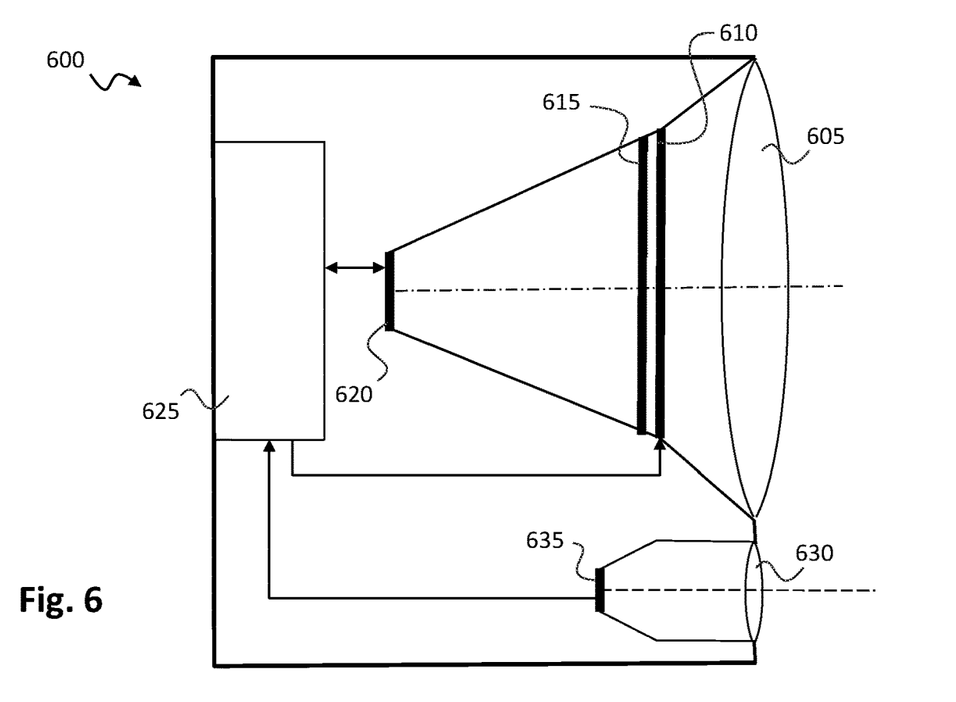
FIG. 6 is a block diagram illustrating an example of architecture for an optical system according to second embodiments of the invention.

FIG. 6 is a block diagram illustrating an example of architecture for an optical system according to second embodiments of the invention.

Like optical system 200 described by reference to FIG. 2, optical system 600 comprises collecting entrance lens 605, dynamic LCD barrier 610, micro-prism array 615, image sensor 620, and computing device 625. Collecting entrance lens 605, dynamic LCD barrier 610, micro-prism array 615, and image sensor 620 are optically aligned.

Image sensor 620 and dynamic LCD barrier 610 are controlled by computing device 625 which also receives images acquired by image sensor 620. Computing device 625 may comprise a network interface to communicate with a remote server.

Again, dynamic LCD barrier 610 is typically an array of masking elements which are controlled individually to block light or to allow light to pass through to play the role of a 'pinhole'. It can be, for example, an array of 5×5 or 10×10 masking elements. Naturally, the number of horizontal masking elements may be different from the number of vertical masking elements. Likewise, the size of the masking elements may vary from one masking element to another one.

In operation, all the masking elements advantageously block light except one which allows light to pass through.

Micro-prism array 615 may consist in a set of micro-prims arranged so that one micro-prism is associated with each masking element of the dynamic LCD barrier (or with most of the masking elements since there is no need to use a micro-prism in conjunction with the masking element aligned on the optical axis of the image sensor).

Each micro-prism aims at directing light passing through the associated masking element to the image sensor.

According to particular embodiments, a lens may be combined with a micro-prism. This is particularly useful when the sizes of the masking elements are not the same for all the masking elements.

Optical system 600 further comprises collecting entrance lens 630 and image sensor 635 which are optically aligned. The field of view of collecting entrance lens 630 is preferably approximately the same as the field of view of collecting entrance lens 605.

Image sensor 635 is preferably configured to acquire low resolution images representing the full field of view of collecting entrance lens 630.

Image sensors 620 and 635 as well as dynamic LCD barrier 610 are controlled by computing device 625 which also receives images acquired by image sensors 620 and 635. Selection of a masking element of dynamic LCD barrier 610 is advantageously based on processing of images acquired by image sensor 635.

For the sake of illustration, in a gaze tracking application, the use of image sensor 635 makes it possible to detect a face in an image and thus, makes it possible to dynamically select a portion of an image that is likely to contain a representation of an eye.

Again, it is to be noted that, for the sake of clarity, no autofocus device is represented in the optical device illustrated in FIG. 6. However, such a device may be implemented in the optical system on a standard basis. The parallax between the two image sensors can be used to estimate the distance of an object to be tracked (e.g. eyes) and thus, to set an autofocus.

According to particular embodiments, steps 505 to 530 described by reference to FIG. 5 can be carried out by computing device 625. Step 505 (identification of a masking element) advantageously comprises the steps described by reference to FIG. 7.

Figure 7:
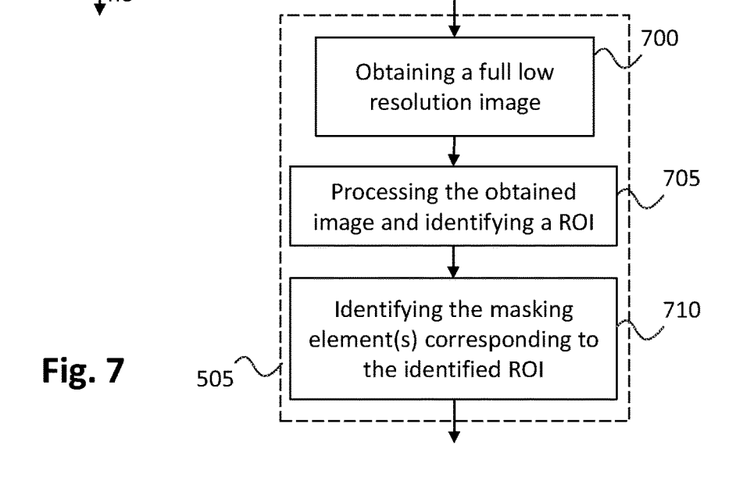
FIG. 7 is a flowchart illustrating steps of a method for identifying a masking element in a method for obtaining images from an image sensor such as the one described by reference to FIG. 5; and, FIG. 8 is a schematic block diagram of a computing device for implementation of one or more embodiments of the invention.

FIG. 7 is a flowchart illustrating steps of a method for identifying a masking element in a method for obtaining images from an image sensor such as the one described by reference to FIG. 5.

As illustrated, a first step is directed to obtaining a full low resolution image (step 700). Such an image can be obtained by using image sensor 635 of optical system 600 described by reference to FIG. 6.

Next, the obtained image is processed to identify a region of interest (ROI) corresponding to a part of the scene for which a high resolution image is to be obtained (step 705).

For the sake of illustration, such a step can be based on a standard feature recognition algorithm.

Then, after having identified a region of interest, the masking element or the masking elements corresponding to that identified region of interest, i.e. the masking elements allowing acquisition of images representing the identified region of interest, are identified (step 710).

Next, carrying out steps 510 to 530 as described by reference to FIG. 5 makes it possible to obtain high resolution images using image sensor 620, these images representing a portion of the field of view of collecting entrance lens 630.

The devices described by reference to FIGS. 2 and 6 as well as the method described by reference to FIG. 5 make it possible to obtain different images that represent different parts of a real scene, the resolution of which enabling, in particular, gaze tracking.

Figure 8:
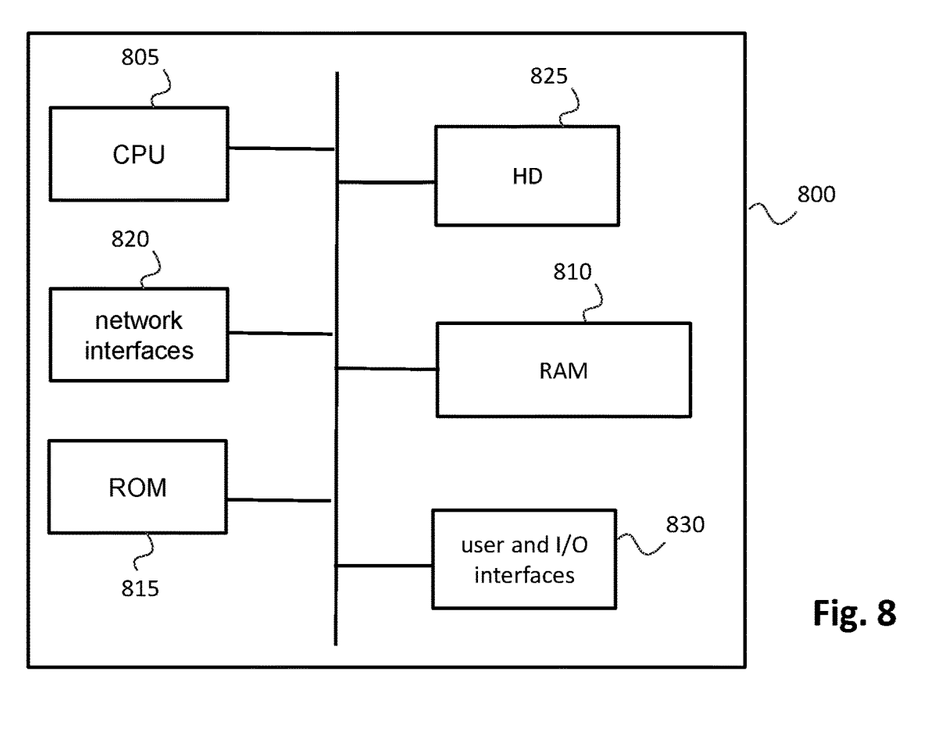

FIG. 8 is a schematic block diagram of a computing device 800 for implementation of one or more embodiments of the invention, for example the computing device 225 or the computing device 625 described by reference to FIGS. 2 and 6, respectively.

Computing device 800 comprises a communication bus connected to:
- a central processing unit 805, such as a microprocessor, denoted CPU;
- a random access memory 810, denoted RAM, for storing the executable code of the method of embodiments of the invention as well as the registers adapted to record variables and parameters necessary for implementing the method for obtaining images according to embodiments of the invention, the memory capacity of which can be expanded by an optional RAM connected to an expansion port for example;
- a read only memory 815, denoted ROM, for storing computer programs for implementing embodiments of the invention; and
- a network interface 820 typically connected to a communication network over which digital data (in particular configuration data and acquired images) can be transmitted or received. The network interface 820 can be a single network interface, or composed of a set of different network interfaces (for instance wired and wireless interfaces, or different kinds of wired or wireless interfaces). Data packets are written to the network interface for transmission or are read from the network interface for reception under the control of the software application running in the CPU 805.

Optionally, the communication bus of computing device 800 may be connected to:
- a hard disk 825 denoted HD used as a mass storage device; and/or
- a user interface and/or an input/output interface 830 which can be used for receiving inputs from a user, displaying information to a user, and/or receiving/sending data from/to external devices.

The executable code may be stored either in read only memory 815, on hard disk 825 or on a removable digital medium such as for example a disk. According to a variant, the executable code of the programs can be received by means of a communication network, via the network interface 820, in order to be stored in one of the storage means of the communication device 800, such as hard disk 825, before being executed.

Central processing unit 805 is adapted to control and direct the execution of the instructions or portions of software code of the program or programs according to embodiments of the invention, such instructions being stored in one of the aforementioned storage means. After powering on, CPU 805 is capable of executing instructions from main RAM memory 810 relating to a software application after those instructions have been loaded from ROM 815 or from hard-disc 825 for example. Such a software application, when executed by CPU 805, causes the steps of the algorithms herein disclosed to be performed.

Any step of the algorithm herein disclosed may be implemented in software by execution of a set of instructions or program by a programmable computing machine, such as a PC ("Personal Computer"), a DSP ("Digital Signal Processor") or a microcontroller; or else implemented in hardware by a machine or a dedicated component, such as an FPGA ("Field-Programmable Gate Array") or an ASIC ("Application-Specific Integrated Circuit").

Although the present invention has been described hereinabove with reference to specific embodiments, the present invention is not limited to the specific embodiments, and modifications which lie within the scope of the present invention will be apparent to a person skilled in the art.

Many further modifications and variations will suggest themselves to those versed in the art upon making reference to the foregoing illustrative embodiments, which are given by way of example only and which are not intended to limit the scope of the invention, the latter being solely determined by the appended claims. In particular the different features from different embodiments may be interchanged, where appropriate.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. An optical device comprising:
an image sensor that acquires digital images,
a collecting entrance lens having a predetermined field of view,
a first prism disposed to refract light from the entrance lens to a set of multiple pixels of the image sensor,
a second prism disposed to refract light from the entrance lens to the set of multiple pixels of the image sensor, and
a dynamically configurable light barrier optically coupled to the first and second prisms between the collecting entrance lens and the image sensor, the dynamically configurable light barrier comprising at least first and second masking elements, the dynamically configurable light barrier being configured so that at least one of the first and second masking elements can be set in a state in which light passes therethrough to the image sensor, the at least first and second masking elements being configured so that images acquired by the set of multiple pixels of the image sensor when the first masking element is configured in a state in which light passes to the set of multiple pixels of the image sensor through the first masking element and refracted by the first prism represent a different multi-pixel portion of the predetermined field of view than images acquired by the image sensor when the second masking element is configured in a state in which light passes to the set of multiple pixels of the image sensor through the second masking element and refracted by the second prism.

2. The optical device of claim 1 wherein the at least first and second masking elements are configured as an array of masking elements arranged perpendicularly to an optical axis of the image sensor and of the collecting entrance lens.

3. The optical device of claim 1 further comprising at least one processor configured to control the dynamically configurable light barrier and receive corresponding acquired images from the image sensor.

4. The optical device of claim 3 wherein the at least one processor is configured to apply a geometric distortion to an image received from the image sensor, the geometric distortion being predetermined and identified as a function of a masking element selected as being in a state in which light passes therethrough.

5. The optical device of claim 1 further comprising a second collecting entrance lens and a second image sensor, images acquired by the second image sensor representing the predetermined field of view.

6. The optical device of claim 5, further comprising at least one processor configured to control the dynamically configurable light barrier and receive images from the image sensor, wherein a masking element to be selected for passing light therethrough is identified as a function of processing an image acquired from the second image sensor.

7. The optical device of claim 1 wherein the dynamically configurable light barrier is of an LCD type.

8. The optical device of claim 1 further comprising a processor operatively connected to receive images acquired by the image sensor, the processor transforming acquired digital images differently depending on the states of the at least first and second masking elements.

9. The optical device of claim 1 wherein each prism is associated with a single corresponding masking element.

10. The optical device of claim 1 further including at least one processor connected to the image sensor and the dynamically configurable light barrier, the at least one processor selecting one of the at least first and second masking elements corresponding to a region of interest portion of the predetermined field of view representing an eye to be set in the state in which light passes through the selected masking element, and tracking gaze of the eye in response to images the image sensor acquires in response to light corresponding to the region of interest portion of the predetermined field of view representing the eye passing through the selected masking element to the multiple pixels of the image sensor.

11. A method for obtaining images in an optical system comprising an image sensor, a collecting entrance lens having a predetermined field of view, a dynamically configurable light barrier having at least first and second masking elements, and a prism array including at least first and second prisms that each refract light passing therethrough, the dynamically configurable light barrier being configured so that at least one of the first and second masking elements can be set in a state in which light passes therethrough, the at least first and second masking elements being configured so that images acquired by multiple pixels of the image sensor when the first masking element is configured in a state in which light passes through the first masking element and is refracted by the first prism to the multiple pixels of the image sensor represent a different multi-pixel portion of the predetermined field of view than images acquired by the image sensor when the second masking element is configured in a state in which light passes through the second masking element and is refracted by the second prism to the multiple pixels of the image sensor, the method comprising:

identifying a masking element and associated prism;

selecting the identified masking element to set the identified masking element in a state in which light passes through the identified masking element and is refracted by associated prism to the multiple pixels of the image sensor; and obtaining signals representing an image from the multiple pixels of the image sensor.

12. The method of claim 11 further comprising a step of obtaining and applying a corrective geometric deformation to an image obtained from the image sensor.

13. The method of claim 12 wherein the corrective geometric deformation is obtained as a function of masking element selection.

14. The method of claim 11 further comprising obtaining an image representing the predetermined field of view, wherein identifying a masking element comprises processing the image representing the predetermined field of view.

15. The method of claim 14 wherein processing the image representing the predetermined field of view comprises identifying a region of interest.

16. The method of claim 11 wherein each prism is associated with a single corresponding masking element.

17. A computer program product for a programmable apparatus, the computer program product comprising instructions for carrying out each step of the method according to claim 11 when the program is loaded and executed by a programmable apparatus.

18. A non-transitory computer-readable storage medium storing instructions of a computer program for implementing the method according to claim 11.

* * * * *